United States Patent

Fuju et al.

[11] Patent Number: 6,080,500
[45] Date of Patent: Jun. 27, 2000

[54] MOVABLE FUEL CELL APPARATUS

[75] Inventors: Akira Fuju; Yosio Azegami, both of Gunma-ken; Nobuyoshi Nishizawa, Tochigi-ken; Akio Kawakami, Saitama-ken; Katsuyuki Makihara, Gunma-ken; Taketoshi Ouki; Akira Hamada, both of Tochigi-ken; Koji Shindo, Gunma-ken; Tatsuji Hatayama, Tochigi-ken; Satoshi Yamamoto, Gunma-ken; Osamu Tajima, Tochigi-ken, all of Japan

[73] Assignee: Sanyo Electric Co. Ltd., Osaka-fu, Japan

[21] Appl. No.: 09/159,847

[22] Filed: Sep. 24, 1998

[30] Foreign Application Priority Data

Sep. 25, 1997 [JP] Japan ................... 9-259775

[51] Int. Cl.$^7$ .............................. H01M 8/00; H01M 8/04
[52] U.S. Cl. .................................................. 429/12
[58] Field of Search ................... 429/12, 34, 96, 429/100

[56] References Cited

FOREIGN PATENT DOCUMENTS

| 813264 | 12/1997 | European Pat. Off. . |
| 6-310166 | 11/1994 | Japan . |
| 08131382 | 5/1996 | Japan . |
| 9-7623 | 1/1997 | Japan . |
| 09092318 | 4/1997 | Japan . |
| 09171842 | 6/1997 | Japan . |
| 10-284100 | 10/1998 | Japan . |

OTHER PUBLICATIONS

Galen R. Frysinger: "The Economical Fuel Cell" I.E.E.E. Spectrum, vol. 6, No. 3, Mar. 1969, pp. 83–90 XP–002090617.

Ishizawa M. et al.: "Portable Fuel–Cell Systems" NTT Review, vol. 9, No. 5, Sep. 1997, pp. 65–69 XP–000704773.

Chemical Abstracts, vol. 125, No. 2, Jul. 8, 1996, abstract No. 15128, Ishizawa, Maki et al.: "Portable Fuel Cell System for Telecomminications Use" XP000666114.

*Primary Examiner*—Maria Nuzzolillo
*Assistant Examiner*—Jonathan Crepeau
*Attorney, Agent, or Firm*—Weingarten, Schurgin, Gagnebin & Hayes LLP

[57] ABSTRACT

There is provided a movable fuel cell apparatus comprising a movable housing, a power supply, and a fuel gas cylinder. The housing is divided into a front portion and a rear portion by a partition, and composed of a main housing body, a housing cover and a door. The main housing body has a front opening. The housing cover covers the upper portion of the front opening and the door is openably connected with the main housing body. The power supply included in the rear portion comprises a fuel cell for generating electric power by electrochemical reaction using fuel gas and air supplied. The fuel gas cylinder is placed removably in the front portion of the housing.

20 Claims, 3 Drawing Sheets

MOVABLE FUEL CELL APPARATUS

BACKGROUND OF THE INVENTION

1. Field of the Invention

The present invention relates to a movable fuel cell apparatus.

2. Background Art

Conventionally a fuel cell apparatus is well known, which has a fuel cell, a battery, a fuel supply, and a controller, etc, stores dump power in the battery after supplying an external load with power generated at the fuel cell, and supply external loads with power compensated by the battery when power generated at the fuel cell is lack.

In such a fuel cell apparatus, a movable fuel cell apparatus is also known, which is installed a fuel cell, a battery, a fuel supply, and various controllers as described above into a housing. Such a movable fuel cell apparatus is applicable to a power supply for civil engineering work or domestic emergency because of excellent portability thereof.

A conventional movable fuel cell apparatus is disclosed in Japanese Patent Laid-Open Publication No. Hei 6-310166, wherein the movable fuel cell comprises a fuel cylinder 1, a fuel modification device 2 which modifies methanol aqueous solution ejected from the fuel cylinder to a gas containing hydrogen, a fuel cell 3 which generates electric power by electrochemical reaction using hydrogen basis gas as fuel, and a housing 5 containing these components, as shown in FIG. 3. The fuel cylinder 1 is removable installed therein and connected to the fuel modification device 2. Reference numeral 4 denotes a control device.

On the other hand, another movable hybrid fuel cell apparatus is disclosed in Japanese Patent Laid-Open Publication No. Hei 9-171842, which comprises hydrogen gas cylinders 1, a fuel cell 3, a control device 4, a housing 5, batteries 6 and a housing cover 7, in which space in the housing 5 is divided into regions A, B, C and D, the region A positioned in the left hand of the space contains the hydrogen gas cylinders 1, the region B positioned in the upper right upper hand of the space contains the fuel cell 3 which generates electric power by electrochemical reaction using hydrogen gas from the hydrogen gas cylinders 1 as fuel, the region C positioned in the right middle hand of the space contains the batteries 6, the region D positioned in the lower right hand of the space contains the control device 4, and the housing cover 7 is attached to the housing 5 for covering the upper opening of the housing 5.

However, in the conventional movable fuel cell apparatus disclosed in Japanese Patent Laid-Open Publication No. Hei 6-310166, the fuel cylinder 1 must be installed in and removed from the housing with effort and is uneasy to handle because the fuel cylinder 1 is installed by being laid down. In addition, it is disadvantageous with regard to safe because the fuel cylinder 1 is connected to the fuel modification device, which carries out modification reaction at a high temperature, in close contact.

On the other hand, in the movable hybrid fuel cell apparatus disclosed in Japanese Patent Laid-Open Publication No. Hei 9-171842, since the hydrogen gas cylinders 1 are stood and placed in the region A at the right hand of the housing 5, they must be taken out and put therein to be installed in and removed therefrom after upwardly opening the housing cover 7. Therefore, it takes the trouble and has lower handling efficiency. Furthermore, it is not safe because the region A is connected to the region B through upper opening even when the housing cover 7 is closed. To avoid lower safety due to possible hydrogen gas leakage, an exhaust fan 8 is provided at an upper part of the region A to exhaust flammable gas out of the housing 5.

SUMMARY OF THE INVENTION

It is an object of the present invention to solve these problems, and to provide a compact movable fuel cell apparatus having high safety, and good operability and manageability for fuel gas cylinders.

A first aspect of the present invention to solve the problems described above is to provide a movable fuel cell apparatus comprising, a movable housing composed of a main housing body having a front opening, a housing cover and a door, said movable housing being divided into a front portion and a rear portion by a partition, the housing cover openably covering over the upper portion of the front opening of the housing main body, the door openably connected with the main housing body to cover the front opening of the front portion except for the portion covered with the housing cover, a power supply placed in the front portion of the housing, the power supply having a fuel cell for generating electric power by electrochemical reaction using fuel gas and air supplied, and a fuel gas cylinder removably placed in the front portion of the housing.

In the present invention, the rear portion of the housing includes the power supply having the fuel cell generating electric power by being supplied fuel gas which is obtained by modifying gas such as hydrogen gas or methane gas, and air, and exhausting high temperature air, and the front portion includes the gas cylinders supplying fuel gas to the fuel cell. The rear portion and the front portion are completely separated by the partition, so that the fuel gas cylinder can be prevented from contacting with high temperature exhausted air. Furthermore, a safety of the fuel cell of the present invention can be enhanced because the power supply is prevented from contacting with the fuel gas of the fuel gas cylinder, if it leaks. Further, the fuel cell of the present invention can be compact. In addition, by opening the housing cover, it can be easy to open and close a valve of the fuel gas cylinder, adjust the valve, attach and detach connection parts to and from a pipe, and adjust and check the piping.

Even when both side faces and a back face of the movable fuel cell apparatus according to the present invention are arranged in contact with a wall etc., it can be readily to perform attachment and detachment, check, and maintenance and inspection with the fuel gas cylinder in the front face in which the fuel gas cylinders can be easily operated by simply opening the door. Also in positioning it outdoors, it is prevented from leaking rain as long as the housing cover and front door are closed. The operations described above are more easily preformed when the door is removably connected with the housing.

A second aspect of the present invention is to provide the movable fuel cell apparatus, wherein a control panel is provided on a front face of the housing main body.

As mentioned above, even when both side faces and the back face of the movable fuel cell apparatus according to the present invention are arranged in contact with a wall etc., it may be possible to start and stop operation easily by using start/stop button provided on the control panel, and to find the condition such as the output voltage or the fuel pressure by observing a digital display on the control panel.

A third aspect of the present invention is to provide the movable fuel cell apparatus, wherein an exhaust duct is provided in the front portion of the housing to release the exhaust from the fuel cell out of the movable housing, and one end of the exhaust duct is fixed to the partition, and the other end thereof is connected closely to exhaust holes provided on the door.

As mentioned above, even when both side faces and the back face of the movable fuel cell apparatus according to the present invention are arranged in contact with a wall etc., it is possible to exhaust from the exhaust holes provided on the door. Exhaust holes provided on the top face of the housing are not preferable because there are problems in that rain leaks into the apparatus, or condensed water contained in the exhaust air penetrates into the power supply such as, for example, the fuel cell. Since in the present invention, the exhaust duct is provided in the front portion of the housing with one end fixed to the partition and the other end fixed closely to the door by a packing or the like, and is connected to the exhaust holes on the door, the exhaust is securely and safely exhausted from the exhaust holes without leaking inside the housing.

A fourth aspect of the present invention is to provide the fuel cell apparatus, wherein a tumble preventing fixture is provided on a bottom of the front portion, which supports a part of the bottom of the fuel gas cylinder, and another tumble preventing fixture is provided on the partition to support upper part and/or body of the fuel gas cylinder.

The fuel cell of the present invention enhances safety because the fuel gas cylinders do not tumble even if accidents, such as earthquake, occur, by means of a fixture provided on the bottom of the fuel gas cylinders, which stably prevent from tumbling, and by means of the tumble preventing fixture provided on the partition to support the upper part and/or body of the fuel gas cylinders.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

The present invention is described in detail hereinafter with reference to embodiments shown in the accompanying drawings.

Figure 1:
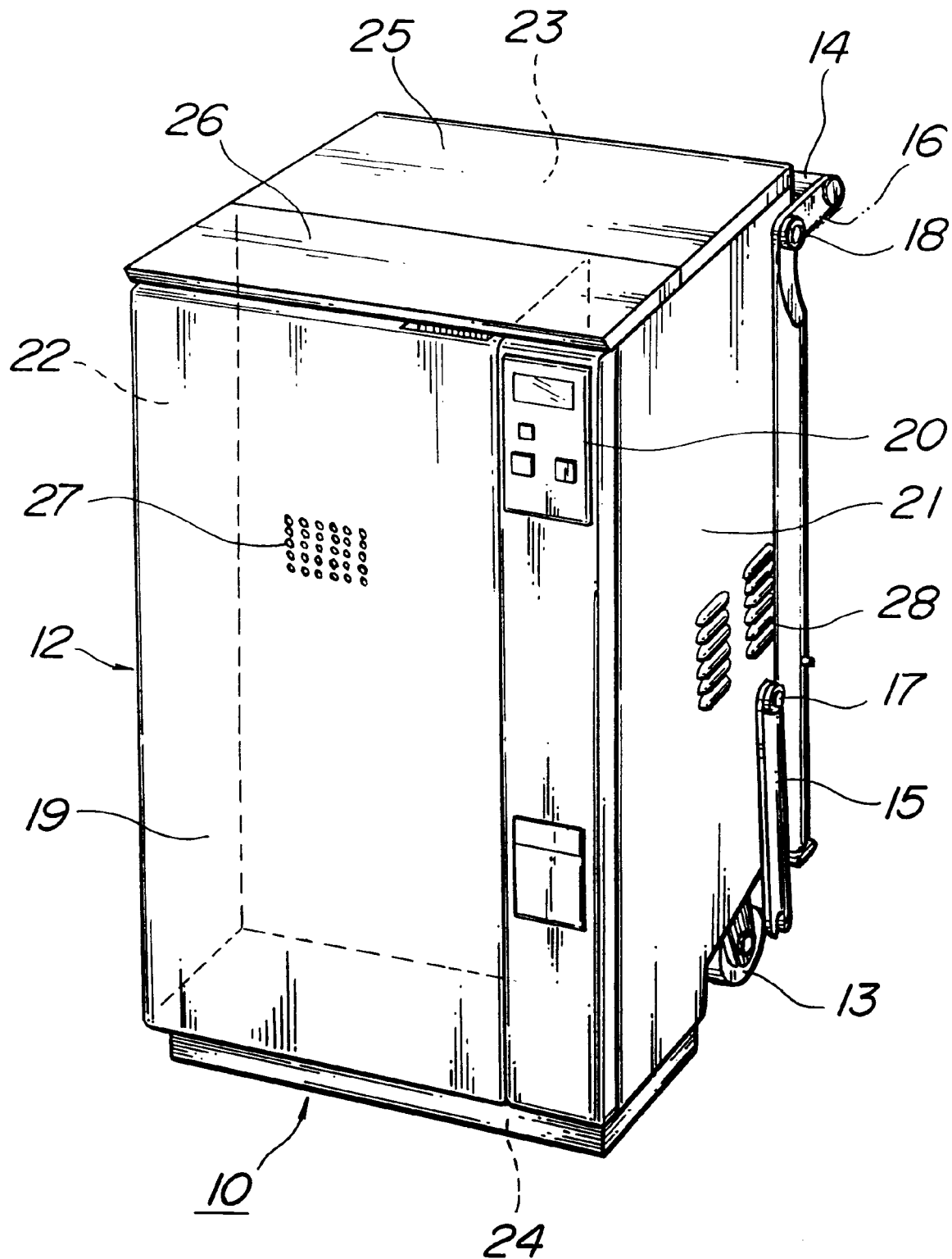
FIG. 1 is a perspective view of a movable fuel cell apparatus in accordance with the present invention.
Figure 2:
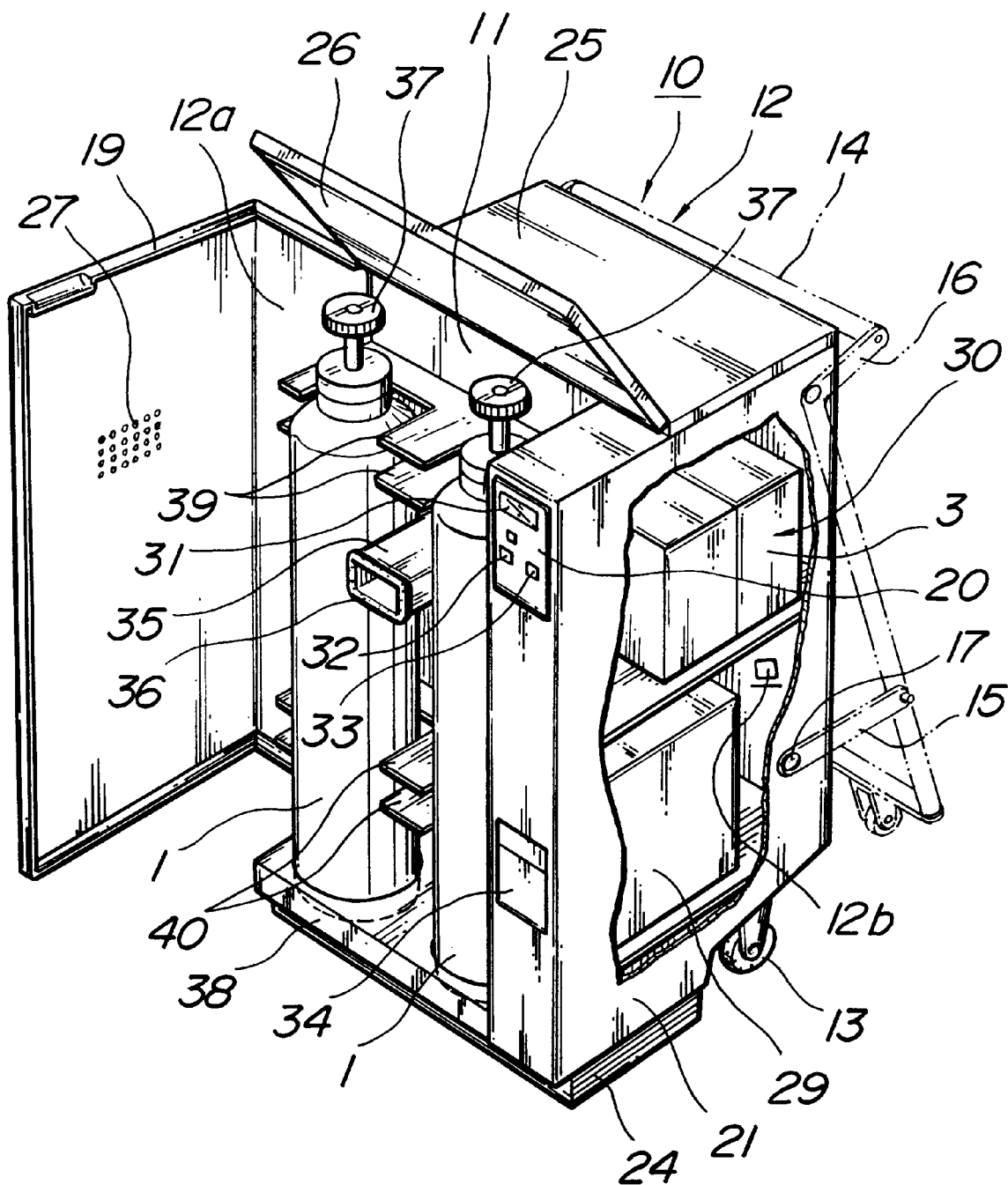
FIG. 2 is a perspective view of a movable fuel cell apparatus shown in FIG. 1, opened the door and the housing cover, a part being broken away.
Figure 4:
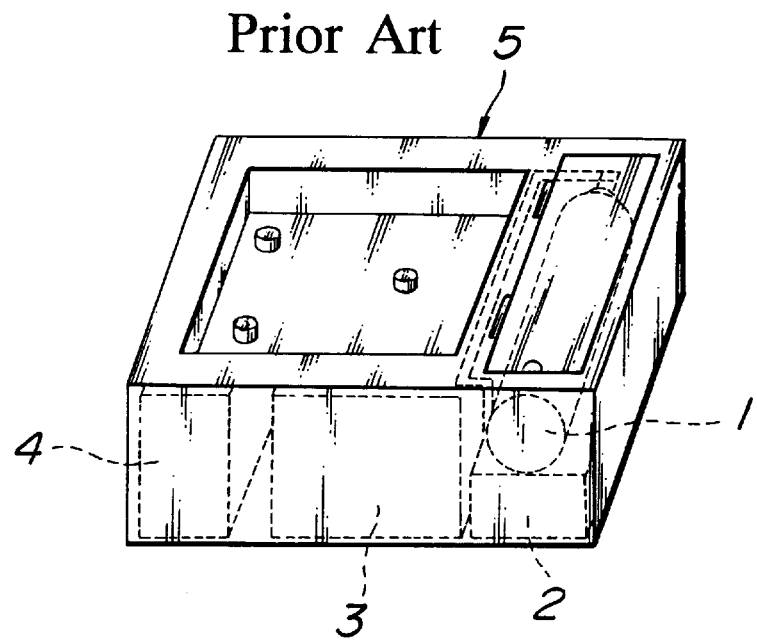
FIG. 4 is a perspective view of another conventional movable fuel cell apparatus.
Figure 3:
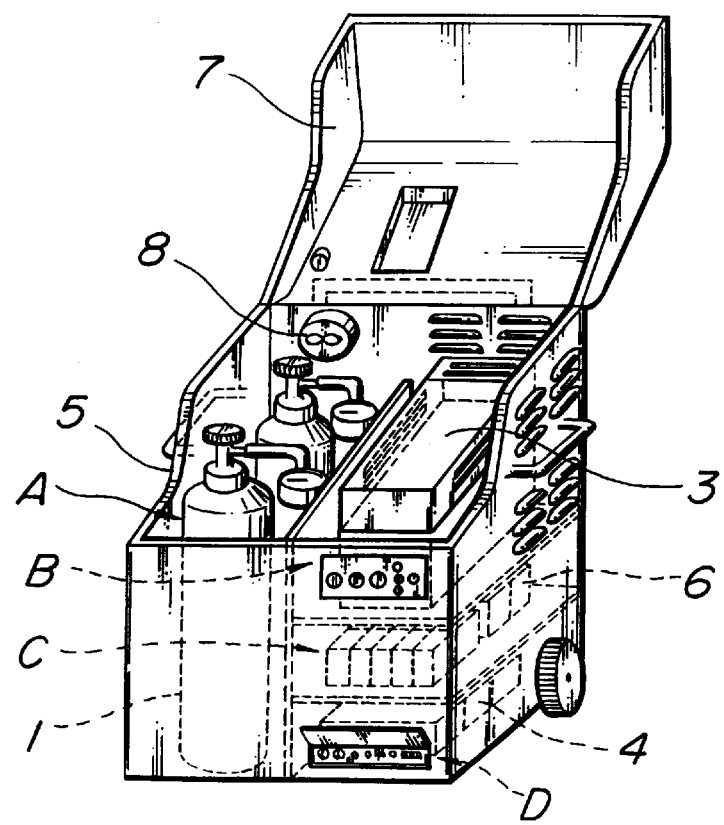
FIG. 3 is a perspective view of one conventional movable fuel cell apparatus.

In FIG. 1 and FIG. 2, a movable housing 12 of the movable fuel cell apparatus 10 according to the present invention has a structure divided into a front portion 12a and rear portion 12b with a partition 11. Two fuel gas cylinders 1 are stood and placed in the front portion 12a, and a power supply 30 including such as a fuel cell 3 and a DC/AC inverter 29 are placed in the rear portion 12b. Further, the fuel cell 3 generates electric power by electrochemical reaction using fuel and air supplied.

Reference numeral 13 denotes movable wheels. Reference numeral 14 denotes a hand grip used in moving the apparatus, and 15 and 16 are supporting arms rotatable independently around fulcrums 17 and 18, respectively. The movable fuel cell apparatus 10 of the present invention can be easily moved alone by using the movable wheels 13 and the hand grip 14.

The movable housing 12 is composed of a main housing body having a front opening and comprising a front face, both side faces 21 and 22, a back face 23, a bottom face 24, a top face 25; a housing cover 26 openably covering over the upper portion of the front opening of the front portion 12a; and a door 19 having an L-shaped section and being openably connected with the main housing body. A control panel 20 is provided on the front face of the main housing body. Reference numeral 27 denotes exhaust holes provided on the door 19, and 28 denotes exhaust slots provided on the side face 21 of the housing 12 to exhaust such as the air in the rear portion 12b of the housing 12.

The height of the movable housing 12 is made slightly higher than that of the fuel gas cylinder 1. The width of the front portion 12a of the housing 12 is made slightly wider than the sum of the double diameter of the fuel cylinder 1 (in the present embodiment), the width of an exhaust duct 35 provided within the front portion 12a of the housing and the width of the control panel 20. The depth of the front portion 12a of the housing 12 is made slightly wider than the diameter of the fuel cylinder 1. The width and depth of the rear portion 12b of the housing 12 are made slightly wider than the width and depth of each arranged members of the power supply 30. In this way, the movable housing 12 is hard to leak in by water even if it is placed outdoors, and is made compact in size.

As the fuel gas cylinder 1, for example, a commercially available one can be used (10L-container, hydrogen content of 1.5 $m^3$). Each upper end of the fuel gas cylinders 1 is provided with a hydrogen supplying valve 37 so that the hydrogen supplying valve 37 is connected to the fuel cell 3 through a hydrogen supplying pipe (not shown). Further, a regulator and a pressure meter (not shown) which displays the pressure in the fuel gas cylinder 1 are inserted into a predetermined position of the hydrogen supplying pipe.

In the control panel 20, such as a digital displaying section 31, a start/stop button 32 and a display switching button 33 are arranged, and the movable fuel cell apparatus 10 of the present invention can be started and stopped by switching the start/stop button 32. By pushing the display switching button 33, the representation, for example an AC output value or a fuel pressure value, can be switched as desired. Reference numeral 34 denotes a watertight plug socket. The control panel 20 may be provided with a display having error displays and caution lamps alarming such as the fuel cell overload state and the fuel gas cylinder 1 exchanging.

The exhaust duct 35 is provided in the front portion 12a of the housing 12, which exhausts the exhausted air from the fuel cell 3 out of the movable housing 12. One end of the exhaust duct 35 is fixed on the partition 11, and the other end thereof is connected closely to the exhaust holes 27 provided on the door 19 through a packing 36 on the edge thereof. Accordingly, the exhaust does not leak in the front portion 12a of the housing 12. The position of the exhaust duct 35 in the front portion 12a of the housing 12, not limited, may be preferably close to the position of the fuel cell 3 as much as possible.

A tumble preventing fixture 38 is provided on the bottom face 24 of the front portion 12a, which stably supports the fuel gas cylinder 1, by inserting a part of the bottom of the fuel gas cylinder 1 into the fixture 38. In addition, tumble preventing fixtures 39 and 40 are installed fixedly to the partition 11, which support the upper part and the body of the fuel gas cylinder 1 inserted. Anchoring the cylinders by using these fixtures 38, 39 and 40, and a cylinder supporting belt (not shown) around the body, the gas cylinders 1 can be stably maintained in standing state without tumbling, even if such as earthquake occurs.

The movable fuel cell apparatus according to the present invention is movable and compact, has good operating and handling performance of a fuel gas cylinder, and the safety thereof is high.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A movable fuel cell apparatus comprising,
    a movable housing composed of a main housing body having a front opening, a housing cover and a door, said movable housing being divided into a front portion and a rear portion by a partition, the housing cover openably covering over the upper portion of the front opening of the housing main body, the door openably connected with the main housing body to cover the front opening of the front portion except for the portion covered with the housing cover,
    a power supply placed in the rear portion of the housing, the power supply having a fuel cell for generating electric power by electrochemical reaction using fuel gas and air supplied, and
    a fuel gas cylinder removably placed in the front portion of the housing.

2. The movable fuel cell apparatus according to claim 1, wherein a control panel is provided on a front face of the housing main body.

3. The movable fuel cell apparatus according to claim 1, wherein an exhaust duct is provided in the front portion of the housing to release the exhaust from the fuel cell out of the movable housing, and one end of the exhaust duct is fixed to the partition, and the other end thereof is connected closely to exhaust holes provided on the door.

4. The movable fuel cell apparatus according to claim 2, wherein an exhaust duct is provided in the front portion of the housing to release the exhaust from the fuel cell out of the movable housing, and one end of the exhaust duct is fixed to the partition, and the other end thereof is connected closely to exhaust holes provided on the door.

5. The fuel cell apparatus according to claim 1, wherein a tumble preventing fixture is provided for supporting a part of said fuel gas cylinder.

6. The fuel cell apparatus according to claim 2, wherein a tumble preventing fixture is provided for supporting a part of said fuel gas cylinder.

7. The fuel cell apparatus according to claim 3, wherein a tumble preventing fixture is provided for supporting a part of said fuel gas cylinder.

8. The fuel cell apparatus according to claim 4, wherein a tumble preventing fixture is provided for supporting a part of said fuel gas cylinder.

9. The fuel cell apparatus according to claim 5, wherein said tumble preventing fixture is provided on a bottom of said front portion of the housing to support a part of the bottom of said fuel gas cylinder.

10. The fuel cell apparatus according to claim 5, wherein said tumble preventing fixture is provided on the partition to support the upper part and/or body of said fuel gas cylinder.

11. The fuel cell apparatus according to claim 6, wherein said tumble preventing fixture is provided on a bottom of said front portion of the housing to support a part of the bottom of said fuel gas cylinder.

12. The fuel cell apparatus according to claim 6, wherein said tumble preventing fixture is provided on the partition to support the upper part and/or body of said fuel gas cylinder.

13. The fuel cell apparatus according to claim 7, wherein said tumble preventing fixture is provided on a bottom of said front portion of the housing to support a part of the bottom of said fuel gas cylinder.

14. The fuel cell apparatus according to claim 7, wherein said tumble preventing fixture is provided on the partition to support upper part and/or body of said fuel gas cylinder.

15. The fuel cell apparatus according to claim 8, wherein said tumble preventing fixture is provided on a bottom of said front portion of the housing to support a part of the bottom of said fuel gas cylinder.

16. The fuel cell apparatus according to claim 8, wherein said tumble preventing fixture is provided on the partition to support the upper part and/or body of said fuel gas cylinder.

17. The fuel cell apparatus according to claim 9, wherein another tumble preventing fixture is provided on the partition to support the upper part and/or body of said fuel gas cylinder.

18. The fuel cell apparatus according to claim 11, wherein another tumble preventing fixture is provided on the partition to support the upper part and/or body of said fuel gas cylinder.

19. The fuel cell apparatus according to claim 13, wherein another tumble preventing fixture is provided on the partition to support the upper part and/or body of said fuel gas cylinder.

20. The fuel cell apparatus according to claim 15, wherein another tumble preventing fixture is provided on the partition to support the upper part and/or body of said fuel gas cylinder.

* * * * *